United States Patent [19]

Ishikawa et al.

[11] Patent Number: 5,023,533
[45] Date of Patent: Jun. 11, 1991

[54] METHOD AND SYSTEM FOR COMPLIANCE CONTROL

[75] Inventors: Hiroshi Ishikawa, Ichikawa; Kei Kawase, Komae, both of Japan

[73] Assignee: International Business Machines Corporation, Armonk, N.Y.

[21] Appl. No.: 477,774

[22] Filed: Feb. 9, 1990

[30] Foreign Application Priority Data

Feb. 10, 1989 [JP] Japan .................................. 1-29713

[51] Int. Cl.$^5$ ............................................ G05D 11/08
[52] U.S. Cl. .................... 318/568.21; 318/687; 318/640; 318/567; 901/29; 901/30; 364/513
[58] Field of Search ................................ 318/560-646, 318/687, 115; 364/513; 310/166, 90.5; 901/29, 30, 38; 414/730

[56] References Cited

U.S. PATENT DOCUMENTS

| | | | |
|---|---|---|---|
| 4,603,284 | 7/1986 | Perzley | 318/568.16 X |
| 4,621,332 | 11/1986 | Sugimoto et al. | 318/568.17 X |
| 4,727,303 | 2/1988 | Morse et al. | 318/631 X |
| 4,733,149 | 3/1988 | Culberson | 318/610 X |
| 4,814,680 | 3/1989 | Hulsing | 318/632 X |
| 4,843,293 | 6/1989 | Futami | 318/610 X |
| 4,860,215 | 8/1989 | Seraji | 901/34 X |
| 4,874,998 | 10/1989 | Hollis, Jr. | 318/568.21 |
| 4,882,528 | 11/1989 | Sogabe et al. | 318/568.1 X |

*Primary Examiner*—Paul Ip
*Attorney, Agent, or Firm*—Philip J. Feig

[57] ABSTRACT

Stable compliance control at a high speed is achieved by cooperation between a manipulator and a wrist body which is located at the end of the manipulator arm.

7 Claims, 5 Drawing Sheets

METHOD AND SYSTEM FOR COMPLIANCE CONTROL

BACKGROUND OF THE INVENTION

The present invention relates to a method and system for stable compliance control at a high speed by cooperation between a manipulator and a wrist body which is located at the end of the manipulator arm and is capable of high speed compliance control.

In many instances the work involved using a manipulator is restricted by the external environment. Parts assembly, crank rotation and grinding work are examples of operations in which an external environment affects a manipulator. In order to perform these operations using a feedback type manipulator based on position control, a high-precision position determining capability and an accurate teaching technique are necessary. However, the high-precision determining capability greatly increases the cost and it is difficult to obtain sufficient precision using present techniques. The exact work orbit teaching also requires much time. On the other hand, it has been proposed that the manipulator be provided with the flexibility to adapt to the external environment restriction by controlling the interactive force according to the restrictive environment. The control of the flexible operation adapting to such environmental restriction is called "compliance control" and the operation realized thereby is called "compliance operation". In other words, the compliance control controls the manipulator hand as if there were a suspension mechanism comprising a spring ($K_s$), a damper ($K_d$), a mass (M) and a source of force ($f_r$) upon the hand as shown in FIG. 2.

As is disclosed in a paper entitled "Historical Perspective and State of the Art in Robotic Force Control", by D. E. Whitney, Proceedings of IEEE International Conference on Robotics and Automation, pp. 262-268, 1985 and the others, most of the conventionally reported compliance control methods are ones which feed back the force information from the external environment using a force sensor, or ones in which the whole arm is composed of an actuator capable of simple torque control such as a direct drive motor.

Although the direct drive arm using a direct drive motor can easily control the compliance, the manipulator itself is apt to be large relative to the moving weight due to the problem of the power weight ratio of present direct drive motors. Furthermore, it becomes a problem from the viewpoint of control that the response frequency decreases remarkably with an increase of compliance due to the inertial effect of a large manipulator weight.

The use of the manipulator which is provided with a decelerator and represented by an industrial manipulator brings about a larger power to weight ratio, making it possible to lighten the manipulator itself. However, since the influence of the deceleration friction becomes large, it becomes difficult to control the force of each joint with high accuracy. A method of obtaining compliance control by mounting the force sensor on the manipulator provided with a decelerator is disclosed in a paper entitled "Implementing Compliance Control with a High Speed Operator" by Hiroshi Ishikawa, et al., Japanese Precision Engineering Institute, Proceedings of the Spring Meeting, 1988, pp. 675-676. Its contents are also disclosed in the specification of Japanese Patent Application 63-59574. According to the disclosed method, the position and the velocity which the hand is to have at present are calculated from the force information obtained by the force sensor, and the position and velocity servo control is executed for each joint. Nevertheless, according to this method, the influence of the external environmental contacted by the end effector is included in the feedback loop, therefore, the system stability is affected by the external environment. Especially when the external environment is very hard, the apparent feedback gain becomes large and the control gain of the manipulator must to be reduced. However, the reduction of the control gain causes the decelerator friction to have a greater affect, thereby greatly reducing the force accuracy. Hence, the realizable area of the compliance is restricted by the decelerator friction and the hardness of the external environment.

In the meantime, a method was disclosed in a paper entitled "A Six Degree-of-Freedom Magnetically Levitated Variable Compliance Fine Motion Wrist" presented by R. L. Hollis, et al. at 4th International Symposium on Robotics Research, Santa Cruz, Ca., Aug. 9-14, 1987, which discloses a wrist body capable of high-precision compliance control on the manipulator, and after the wrist body is moved by the manipulator to the position where the work is to be done and the manipulator is fixed in position, the compliance control is activated by the wrist body. Yet, there arises a problem that a large movable area cannot be obtained during the compliance control since the manipulator position is fixed during compliance control by the described method.

For complex operation with the manipulator, such as assembly work, the capability of realizing arbitrary or adjustable compliance of the hand and changing the compliance freely is required. The present invention describes a method capable of stable compliance operation over a wide range of motion, which responds at a high speed to an extraordinarily hard object while contacting it very softly, in a manner impossible with conventional compliance control.

According to the present invention it becomes possible to touch a very hard object to be worked, making it possible to perform assembly and fitting between hard parts made of metal and the like. Such assembly of hard parts is highly desired at factory sites. Conventionally, such work may be performed only by an expensive direct drive arm. Moreover, according to the present invention, it now becomes possible to perform a high speed compliance operation which is not possible with the direct drive arm. The high speed compliance operation has also been in great demand at factory sites.

In order to realize a small inertia compliance operation which is not influenced by the external environment, the end of the manipulator is provided with a wrist body capable of compliance control. As described above, this structure has the problem that a large range of motion cannot be obtained during compliance control. The present invention enlarges the range of motion of the wrist body by moving the wrist body with the manipulator to a position where the wrist body can be effectively operated at all times.

Wrist bodies driven by a voice coil motor or a periplanar coil motor are employed. By using these actuators, a relatively linear force-current characteristic may be obtained, therefore, compliance control becomes possible without force feedback. Namely, since the force from the external environment does not enter into the feedback loop, stable compliance control may be carried out without any influence from the external environment. Furthermore, high speed motion becomes possible because of the small inertia of the wrist body. In order to cope with the small range of actuator motion, and the manipulator moves the wrist body to a position where the wrist body actuator can operate effectively at all times. A description of the wrist body structure of six degree-of-freedom motion and the control algorithm, for a manipulator and wrist body having six degree-of-freedom, will be described hereinafter.

A suitable example of the six degree-of-freedom wrist body is disclosed in the above paper by R. L. Hollis et al. and its contents are also described in the specification of Japanese Patent Application No. 63-131799. The following cites a part of the contents of the above patent application.

SUMMARY OF THE INVENTION

According to the present invention, the hand compliance can be freely controlled by the cooperation between the manipulator and the wrist body, and the following features can be obtained compared with the conventional method:

(1) the hardness of the external environment (object which the hand touches) does not have any affect,
(2) the hand hardness can be varied from an extremely soft state to an extremely hard state,
(3) the hand can respond at a high frequency even if the hand is in the soft state, and
(4) a wide range of motion of the hand for executing the foregoing compliance control can be obtained.

DETAILED DESCRIPTION

Figure 3:
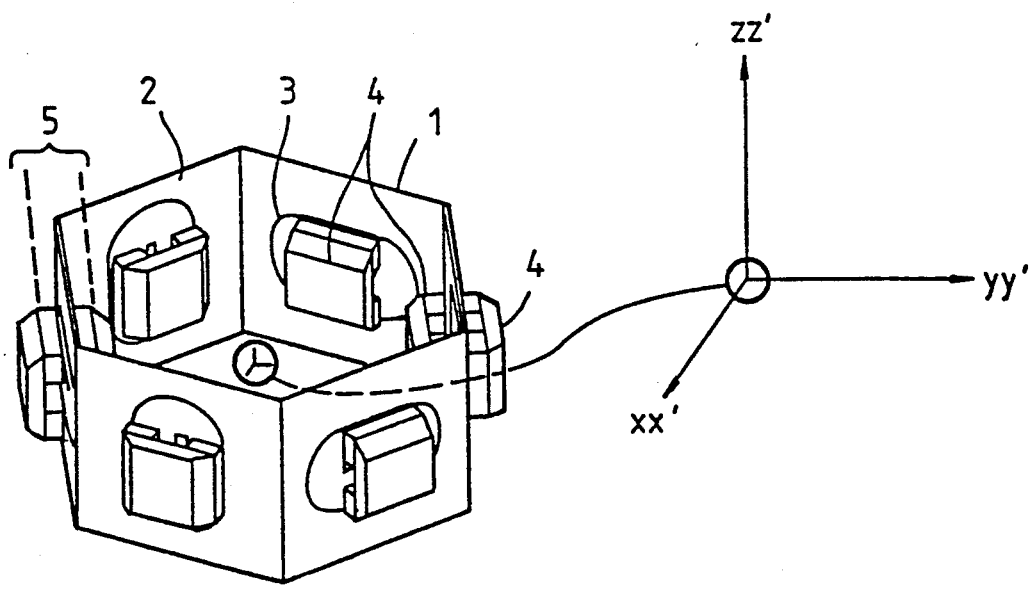
FIG. 3 is a perspective view of a typical wrist body.

The magnetically levitated wrist body of the preferred embodiment in FIG. 3 features a single moving part, a dynamically levitated movable "flotor" element 1. A hollow rigid shell-like moving flotor shell 2 contains planar or quasi-planar curved magnetic flotor coils 3. The flotor unit 1 is the levitated structure of the wrist; it bears the same relationship to the fixed structure (stator) as does the more commonly known rotor in a magnetic bearing, hereinafter called "flotor." Note that the relative position of flotor and stator as moving and fixed elements, respectively, may be exchanged, but for clarity the coil-bearing element will be designated the flotor in this text. The flotor 1 structure carries a tool chuck or gripper (not shown). The tool chuck or gripper, or equivalent, whether with or without a tool, may be called the "end effector," the "gripper", or simply the "hand". In this specification, the end of the hand with the gripper is referred to as a "hand," or the end of the wrist body itself without the gripper is also referred to as a "hand."

FIG. 3 shows a flotor unit 1 which is in the shape of a prism of hexagonal cross-section. The flotor coils 3 are integral to "forcer" elements 5 (actuators), each flotor coil 3 interacting with its respective magnet assembly 4 within the associated forcer element 5 to produce motion of the flotor unit 1. In the preferred embodiment, a flexible ribbon cable provides electrical connections to the coils 3 without restricting the motion of the flotor unit 1. That is, adjacent forcer elements 5 are oriented at right angles to each other around the hexagonal flotor unit 1. The flotor coils 3 operate within large magnetic gaps in a fixed stator structure containing permanent magnets. Suitable means for controlling flotor coil 3 currents is provided to produce a fine motion device capable of moving with high translational and rotational accelerations over distances and angles limited by the size of the magnetic gaps. The forcer elements 5 are arranged in such a manner as to provide three orthogonal translational degrees of freedom (X, Y, Z) and three orthogonal rotational degrees of freedom (X rotation, Y rotation, Z rotation) developed by coil currents specified by a control unit not shown in FIG. 3. As shown in FIG. 3, the six forcer elements 5 are not arranged identically, but rather are rotated 90° from their adjacent forcer elements. In the preferred embodiment, they are alternately horizontal and vertical. These may be parallel to flotor unit 1 top surface as shown in FIG. 3, or may be at +45°, −45°, or otherwise to accomplish the same purpose. The hollow moving shell flotor unit 1 is suspended by actively controlled magnetic levitation in such a manner that the compliance (stiffness) can be varied over a wide range of magnitudes and directions under program control.

The flotor unit 1 has a periplanar coil (planar to match the rectangular face of flotor unit 1 with hexagonal periphery, or curved to match a different flotor unit 1 configuration with curved periphery.) For six degrees of freedom, a number (at least six) of flat-wound periplanar (flat or curved) flotor coils 3, operating in magnetic fields produced by permanent magnet assemblies are required to produce actuation forces and torques in three dimensions. The periplanar coils 3 are rigidly incorporated in the lightweight hollow shell flotor unit 1 which comprises the moving part of the wrist. Alternatively, for some applications, the magnets 4 and associated structures can be made to move, with the flotor unit 1 coil structure fixed, an arrangement which has some advantages for cooling.

The basic electromechanical unit which provides a source of force or (in pairs) torque to the wrist is a periplanar (flat and curved) coil electrodynamic drive unit, or forcer element.

The preferred embodiment provides six forcer elements and a ring-like shell flotor unit 1. This closed configuration makes it convenient for mounting the wrist on a robot arm and, in turn, for mounting tooling or other end effectors to the wrist.

FIG. 3 shows six forcer elements 5, alternately arranged vertically and horizontally about a ring with a hexagonal cross-section. The inner ring of magnets and return plates are rigidly connected with a ring-shaped mechanical support (not shown) and similarly for the outer ring of magnets and return plates. These inner and outer rings form the fixed stator structure having a closed dual periphery. The circumference surface is attached to the manipulator. A hexagonal top plate not shown serves as an end effector mounting platform.

In FIG. 3, the wrist is shown at its zero position, floating in the magnetic gaps. In this configuration the flotor XYZ and stator X'Y'Z' frames are coincident. For a wrist approximately 200 mm in diameter, translations and rotations on the order of ±4 mm and ±5° are easily achieved.

Figure 4:
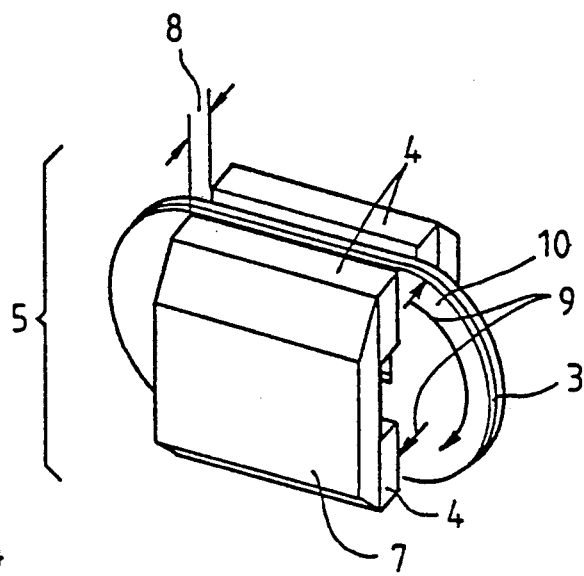
FIG. 4 is a perspective view of a forcer element (actuator) forming a portion of the wrist body.

FIG. 4 shows a typical forcer element 5. Four permanent magnets 4 with two permeable return plates 7 provide high fields (arrows 9) in the large gap 8. Current in the periplanar coil 3 produces a force mutually orthogonal to the field and current directions.

A pair of permeable return plates 7 serve to return the flux. Typical gap flux densities B for the preferred embodiment are about 7 kG. Current i in flotor coil 3 interacts with the field to produce a force $F = BiL$, where L is the effective length of wire in the magnetic gap 8. Flat coils such as those used in the forcer elements similar to those described here are commonly used as actuators in disk files. In disk files, an attempt is made to minimize the gap length to maximize the effective field and reduce stray fields. In this embodiment, the gap 8 is necessarily much larger than the thickness of flotor coil 3 to allow motion in all six degrees of freedom.

Passive damping is provided in the preferred embodiment forcer element 5 design by adding a sheet 10 of conducting material, e.g. copper, as facings for the coils 3. As the conducting sheets move in the magnetic gap, eddy currents are generated which are proportional to the velocity, and which generate damping (cushioning) forces which oppose the motion and are proportional to velocity. The passive damping tends to reduce the magnitude of structural vibration modes and simplifies the control algorithm.

Figure 5:
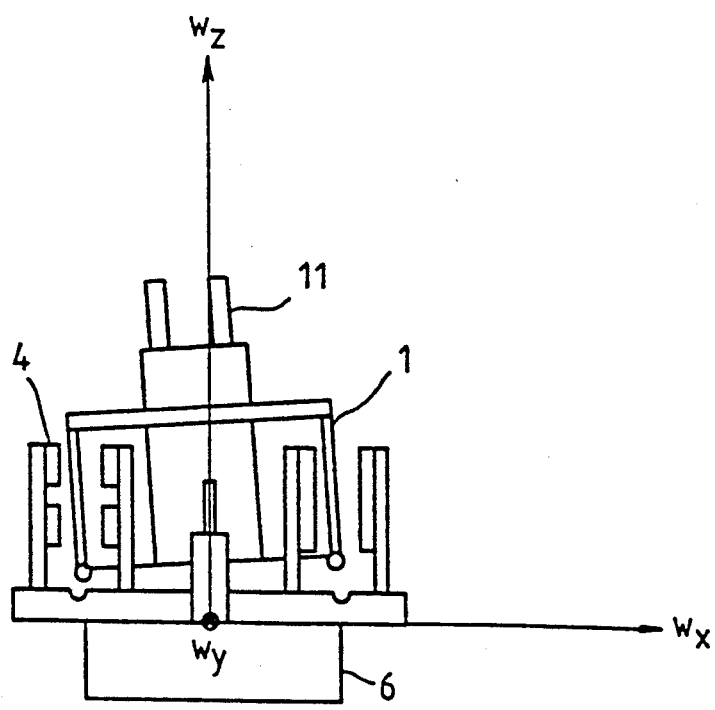
FIG. 5 is an elevation sectional view illustrating the wrist body coordinates.

FIG. 5 is an elevation vertical section view of the wrist, showing flotor unit 1 holding periplanar coils 3 in juxtaposition with forcer magnets 4. Flotor unit 1 is levitated; that is, it is suspended in space by virtue of magnetic forces. The flotor unit 1 carries end effector 11. The base of the wrist body is coupled to an end of coarse manipulator 6.

The wrist coordinates $^wx$, $^wy$ and $^wz$ which will be described below are the fixed coordinates at the top end of the manipulator as shown in FIG. 5. As is clear from the foregoing explanation, the wrist body has six degree-of-freedom of translation and rotation for the respective axis of $^wx$, $^wy$ and $^wz$.

Figure 6:
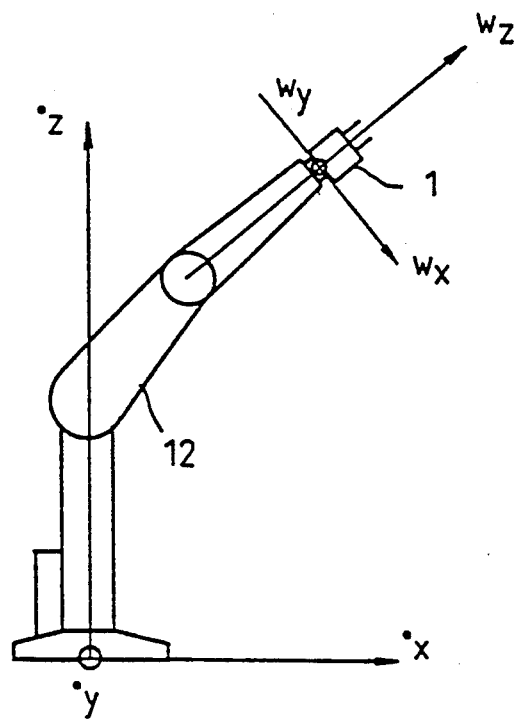
FIG. 6 is an elevational view of a manipulator illustrating world coordinates and wrist body coordinates.

The manipulator 12 in FIG. 6 also has six degree-of-freedom of translation and rotation motion for the respective axis of the world coordinates $^ox$, $^oy$ and $^oz$ as shown in FIG. 6 and is provided with the wrist body 1 at the end of the manipulator.

Figure 1:
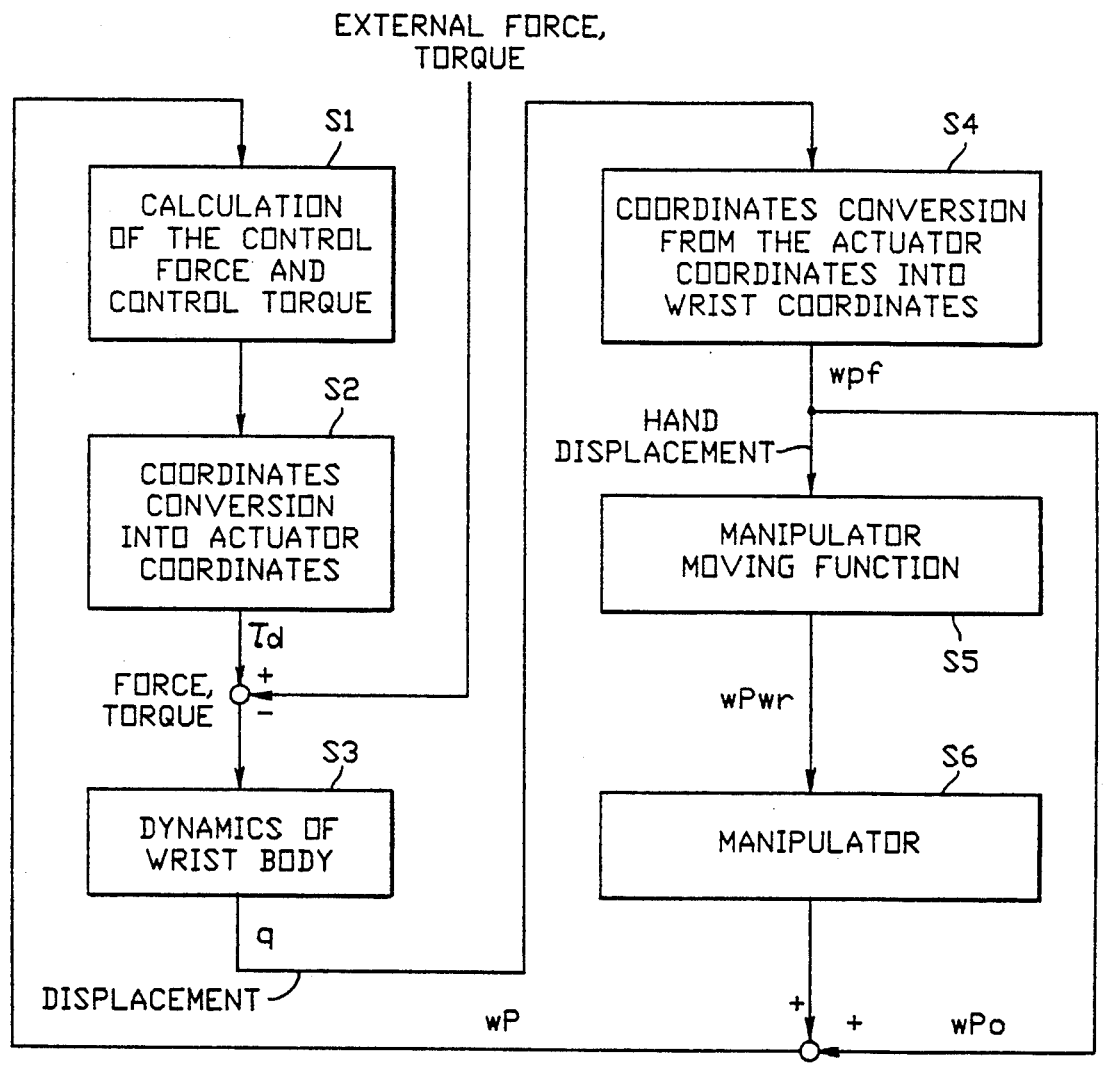
FIG. 1 is a block diagram of a control method according to the present invention.

The respective steps of the compliance control method according to the present invention will be described below with reference to FIG. 1.

Figure 2:
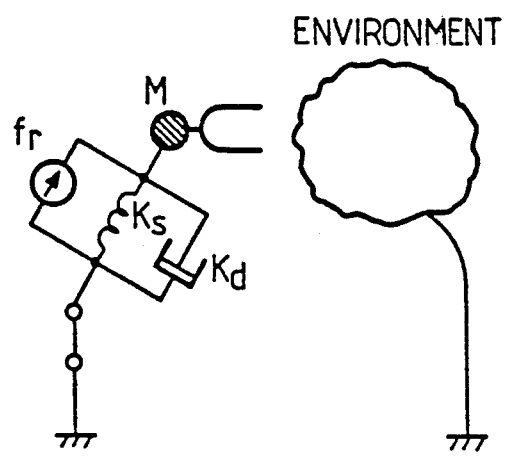
FIG. 2 is a schematic drawing for illustrating hand compliance.

In step S1 the control force and control torque are calculated in the following manner. If the hand has a compliance based upon the second order system as shown in FIG. 2, the equation of motion is expressed by Equation (1), $$^oM(^oP_r - ^o\ddot{P}) + ^oK_d(^oP_r - ^o\dot{P}) + ^oK_s(^oP_r - ^oP) + ^of_r - ^of = 0 \quad (1)$$

where, $^oP_r$: reference value (6 vectors) of the hand position in world coordinates $^oP$: hand position (6 vectors) in world coordinates $^of_r$: reference value (6 vectors) of the force given to the hand in world coordinates $^of$: force (6 vectors) given to the hand in world coordinates $^oM$: imaginary mass-inertia (6×6 matrix) in world coordinates $^oK_d$: imaginary attenuation coefficients (6×6 matrix) in world coordinates $^oK_s$: imaginary spring coefficient (6×6 matrix) in world coordinates $^oM$, $^oK_d$ and $^oK_r$ are arbitrarily specified.
Therefore, the force to be produced by the wrist body is expressed in the wrist coordinates:

$$^wf_d = ^wM(^w\ddot{P}_r - ^w\ddot{P}) + ^wK_d(^w\dot{P}_r - ^w\dot{P}) + ^wK_s(^wP_r - ^wP) + ^wf_r \quad (2)$$

where, $^wP_r$: reference values (6 vectors) of the hand position in wrist coordinates $^wP$: hand positions (6 vectors) in wrist coordinates $^wf_r$: reference values (6 vectors) of the force given to the hand in wrist coordinates $^wf_d$: desired force (6 vectors) given to the hand in wrist coordinates $^wM$: imaginary mass-inertia (6×6 matrix) in wrist coordinates $^wK_d$: imaginary attenuation coefficient (6×6 matrix) in wrist coordinates $^wK_s$: imaginary spring coefficient (6×6 matrix) in wrist coordinates $^wP$ is fed back in the manner described below.

$^w\dot{P}$ and $^w\ddot{P}$ are determined by differentiating $^wP$ with respect to time.

The determination up to $^w\ddot{P}$ attains the high-accuracy control. However, it is to be noted that the acceleration term is not necessarily required. It is assumed in Equation (2) that the acceleration term is neglected, that is $^wM$ is set to zero.

Each actuator (forcer element) of the wrist body may be moved in one dimension. Then, the actuator position can be expressed by one-dimensional coordinates. The six dimensional coordinates expressing these six actuator positions are called "actuator coordinates." The output of step S1 is the input to step S2 where the coordinate conversion into the actuator coordinate occurs as follows.

The desired force $\tau_d$ to be produced by each actuator can be expressed as follows, using Jacobian matrix $J_f$ which converts the wrist coordinates with respect to the wrist body into the actuator coordinates:

$$\tau_d = J_f^T \cdot ^wf_d \quad (3)$$

where, $\tau_d$: desired force to be produced by each actuator of the wrist body $J_f$: Jacobian matrix of the wrist body (The superscript T represents a transposition).

If it is assumed that the force-current characteristic of each actuator of the wrist body is linear, the current should be controlled so as to set the force of each actuator at $\tau_d$.

The hand is displaced according to the force $\tau_d$ produced by each actuator of the wrist body and the force (external force) applied to the hand from an external source. The difference of the two forces, $\tau_d$ and the external force, torque, is provided as the input for step S3. One example, is the case where the hand touches an extremely hard object. In this case, although the wrist body, that is, the hand produces a force by the above current, the hand displacement becomes almost zero. It is to be noted that since the hand position has a constant position relationship with the movable wrist body the actuator displacement is obtained as the quantity corresponding to the hand displacement in step S3.

Considering the manipulator, with reference to step S4, the hand displacement ${}^wP_f$ in wrist coordinates is expressed as follows, using the displacement $q$ of each actuator of the wrist body in actuator coordinates and Kinematics Kin(q) of the wrist body:

$${}^wP_f = Kin(q) \tag{4}$$

where, ${}^wP_f$: hand displacement (six vectors) in wrist body coordinates

Kin(q): displacement conversion function from actuator coordinates into wrist coordinates q: displacement (six vectors) of the actuator of the wrist body $${}^wP_f = {}^wP - {}^wP_o \tag{5}$$

Figure 7:
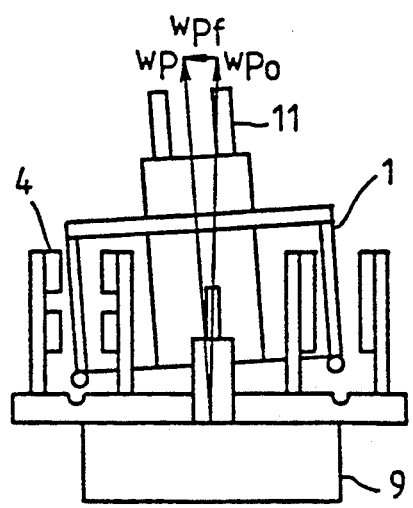
FIG. 7 is an elevation sectional view illustrating hand displacement.

This relationship is shown in FIG. 7, where ${}^wP_o$: hand position (neutral position) before ${}^wf_d$ and the external force are given ${}^wP$: present hand position (state where ${}^wf_d$ and the external force are given)

${}^wP_f$: hand displacement by ${}^wf_d$ and the external force

Now, the explanation will be made by setting the standard point ${}^wP_w$ of the wrist position in wrist coordinates at the same position as ${}^wP_o$.

$${}^wP_w = {}^wP_o \tag{6}$$

where, ${}^wP_w$: wrist body standard position (six vectors) in wrist body coordinates In this case, ${}^w\dot{P}$, ${}^w\ddot{P}$ are as follows:

$${}^w\dot{P} = {}^wv = {}^wv_f + {}^w\omega_f \times {}^wP_f + {}^wv_w \tag{7}$$

$${}^w\ddot{P} = {}^w\dot{v} = {}^w\dot{v}_f + 2{}^w\omega_f \times {}^wv_f + {}^w\omega \times ({}^w\omega_f \times {}^wP_f) + {}^w\dot{\omega} \times {}^wP_f + {}^w\dot{v}_w \tag{8}$$

$${}^w\omega = {}^w\omega_w + {}^w\omega_f, \quad {}^w\dot{\omega} = {}^w\dot{\omega}_w + {}^w\dot{\omega}_f$$

where, ${}^wv$: hand velocity (six vectors) in wrist body coordinates ${}^w\dot{v}$: hand acceleration (six vectors) in wrist body coordinates ${}^wv_f$: velocity (six vectors) produced by the wrist body in wrist body coordinates ${}^wv_\omega$: wrist body velocity (six vectors) in wrist body coordinates ${}^w\omega$: hand angular velocity (six vectors) in wrist body coordinates ${}^w\dot{\omega}$: hand angular acceleration (six vectors) in wrist body coordinates ${}^w\omega_f$: angular velocity (six vectors) produced by the wrist body in wrist body coordinates ${}^w\omega_w$: wrist body angular velocity (six vectors) in wrist body coordinates The value ${}^wP_f$ cannot exceed the wrist body range of motion (usually not so large). Therefore, the manipulator may move the wrist position ${}^oP$ over the wrist body range of motion by controlling the wrist position ${}^wP_w$ so that ${}^wP_f$ may not exceed the wrist body movable area. For this, in step S5, the position control should be carried out by giving the objective value of the wrist position as shown in the following Equation.

$${}^wP_{wr} = Filter({}^wP_f) \tag{10}$$

where, ${}^wP_{wr}$: objective values (six vectors) of the wrist position in wrist body coordinates Manipulator moving function, that is, Filter will be detailed later.

The position control is carried out so in step 6 so as to make the present position ${}^wP_o$ of the manipulator coincident with the reference value ${}^wP_{wr}$ given in step S5.

${}^wP$ is obtained by adding the resultant present position ${}^wP_o$ by the position control from step 6 and the ${}^wP_f$ determined in step S4. ${}^wP$ is used as the input for the calculation in step S1 described above.

The foregoing steps are repeatedly performed at a high frequency.

This filter Filter (${}^wP_f$) should be selected so as to move the hand position ${}^oP$ as widely as possible and operate the manipulator stably. The stability of the one-dimensional model will now be considered. The foregoing control rules are shown by a block diagram in one dimension in FIG. 8.

Figure 8:
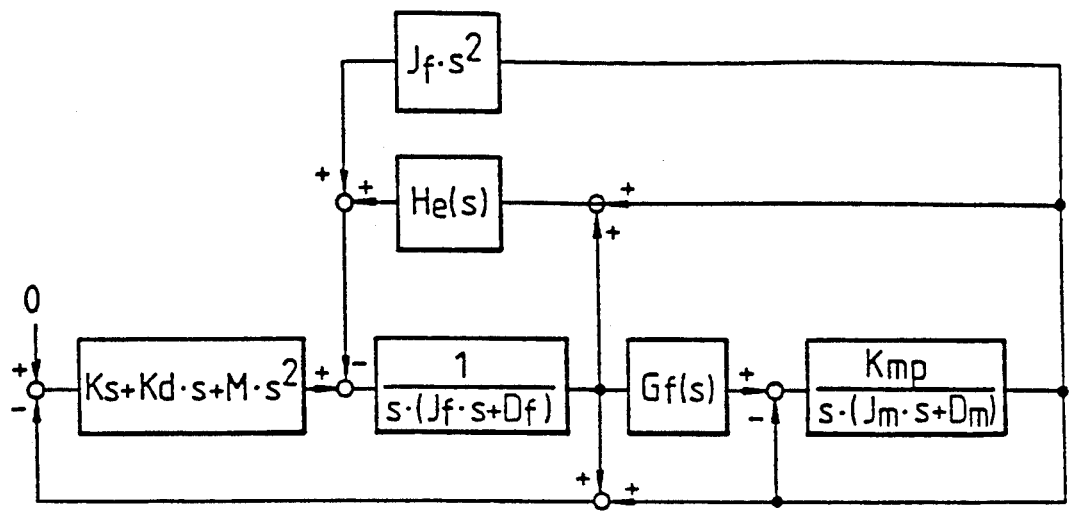
FIG. 8 is a block diagram of the one-dimensional model of the present control method used for analysis.

The meaning of the symbols in FIG. 8 are as follows:

$K_s$: imaginary spring coefficient of the desirable compliance $K_d$: imaginary attenuation coefficient of the desirable compliance M: imaginary inertia of the desirable compliance $J_f$: wrist body inertia $D_f$: attenuation coefficient of the wrist body $K_{mp}$: position control gain of the manipulator $J_m$: manipulator inertia $D_m$: manipulator attenuation coefficient $H_e(s)$: transfer function of the external environment (object which the hand touches)

Gf(s): filter transfer function

S: parameter.

Figure 9:
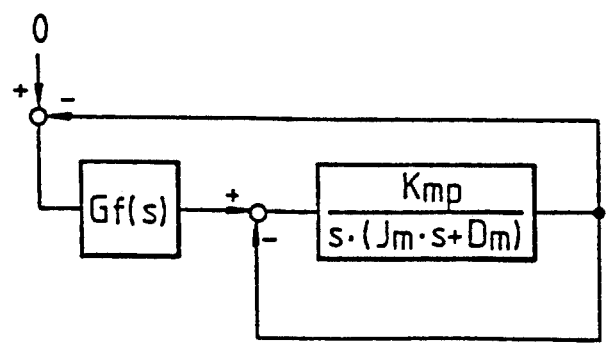
FIG. 9 is a block diagram in which the external environment (object which the hand touches) is extremely hard in a one-dimensional model of FIG. 8.

Generally, the control system becomes unstable with the increase of the feedback quantity. In the system of FIG. 8, the feedback quantity increases with the gain of the external environment transfer function $H_e(s)$. As a result, the system stability is the worst when the hand touches a very hard object. This corresponds to the case where the gain of the external environment transfer function $H_e(s)$ is extremely large. When $|H_e(s)|$ is infinite, the block diagram of the system is shown by FIG. 9. In FIG. 9, by setting $D_m = 2(J_m \cdot K_{mp})^{\frac{1}{2}}$ and $T = (J_m/K_{mp})^{\frac{1}{2}}$, one recurrence transfer function G(s) is expressed by Equation (11).

$$G(s) = \frac{Gf(s)}{(1 + S \cdot T)^2} \tag{11}$$

In order to increase the range of motion of the hand position ${}^oP$, $|G(s)|$ should be larger. On the other hand, for system stability, it is required that $\angle G(s) = -180°$ and $|G(s)| \leq 1$. Therefore, the filter transfer function Gf(s) may be expressed by the following equations, taking the phase margin into account:

$$Gf(s) = K_p + K_i/s \qquad (12)$$

$$Gf(s) = K_p/(1 + K_i S) \qquad (13)$$

$K_p$: proportion gain
$K_i$: integration gain
s: Laplace operator

Although the filter transfer function described by equation (12) attains a larger range of motion at a high frequency than that of the filter transfer function described by equation 13, the latter function described by equation 13 has superior characteristics in other respects. These transfer functions should be appropriately determined according to the application.

Example of the transfer function:
when $T = 7.9 \times 10^{-3}$ [sec/rad]
$Gf(s) = 3.66 + 231/s$

What is claimed is:

1. A method for compliance control of a robot having a manipulator and a wrist body having a hand which is located at the end of the manipulator, is movable relative to the manipulator, and generates an adjustable force at the hand, comprising the steps of:
   (a) determining at least the values of the position and the velocity of the hand;
   (b) determining the force to be generated at the hand responsive to the detected values of the position and velocity of the hand;
   (c) causing the wrist body to generate the force determined in step (b), and
   (d) if the position of the hand is varied by step (C), then controlling the position of the manipulator so that the range of motion of the wrist body is compensated for responsive to the varied position by step (c).

2. A method as set forth in claim 1, wherein said step (d) comprises determining the hand displacement, determining the reference position of the manipulator responsive to the hand displacement, and controlling the manipulator position to coincide with the desired position.

3. A method as set forth in claim 2, wherein said determining the reference position of the manipulator comprises subjecting the hand displacement to a filter function.

4. A method as set forth in claim 3, wherein said filter function is $$K_p + K_i/S$$

where $K_p$ is a proportion gain; $K_i$ is an integration gain and S, is a Laplace operator.

5. A method as set forth in claim 3, wherein said filter function is $$K_p(1 + K_i S)$$

where $K_p$ is a proportion gain; $K_i$ is an integration gain and S, is a Laplace operator.

6. A method as set forth in claim 2, wherein said step (a) determines the hand position by adding the hand displacement determined by said step (d) and the resultant manipulator position by said controlled position, and detects the hand velocity by differentiating the detected hand position with respect to time.

7. A system for compliance control comprising:
   (a) a manipulator;
   (b) a wrist body, having an actuator and a hand, disposed at an end of said manipulator;
   (c) means for determining at least the position and the velocity of said hand;
   (d) means for determining a force to be generated at said hand responsive to the position and velocity from said means for determining and said actuator causing said hand to generate said force;
   (e) means for determining the hand displacement resulting from said actuator causing said hand to generate said force; and
   (f) means for controlling the position of the end of said manipulator by determining the reference position of said manipulator responsive to said hand displacement determined by said means for determining the hand displacement.

* * * * *